United States Patent [19]
Lewis

[11] 3,812,751
[45] May 28, 1974

[54] MITER CLAMP VISE AND SAW
[76] Inventor: Robert W. Lewis, P.O. Box 132285, Oakland, Calif. 94661
[22] Filed: Sept. 8, 1972
[21] Appl. No.: 287,422

[52] U.S. Cl. ................ 83/471.3, 83/466, 83/471.2, 269/41, 83/581
[51] Int. Cl. ........................ B27b 5/20, B23d 45/14
[58] Field of Search ....... 83/471, 471.2, 471.3, 466, 83/581, 465, 452, 454; 269/41

[56] References Cited
UNITED STATES PATENTS

| | | | |
|---|---|---|---|
| 600,118 | 3/1898 | Bruno | 269/41 X |
| 960,159 | 5/1910 | Dipworth | 269/41 X |
| 1,179,140 | 4/1916 | Repp | 83/471.3 |
| 1,481,569 | 1/1924 | Tannewitz | 83/471.3 |
| 2,207,370 | 7/1940 | Bayley et al. | 83/466 |

*Primary Examiner*—Donald R. Schran
*Attorney, Agent, or Firm*—William R. Piper

[57] ABSTRACT

A miter clamp vise and saw that can grip an elongated piece of material and make a transverse cut in it that is at a 45° angle right or left to the length of the material. Also the device can clamp two pieces that have already had their ends provided with 45° angle cuts, the clamps gripping the pieces for holding the mitered ends in abutting relation while the operator secures these ends together by nails or adhesive and the like.

5 Claims, 9 Drawing Figures

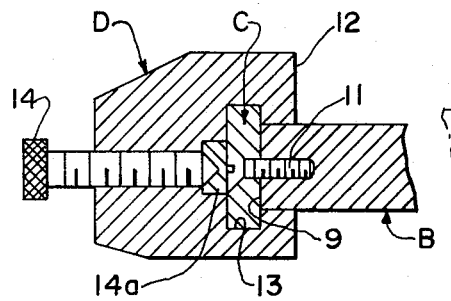
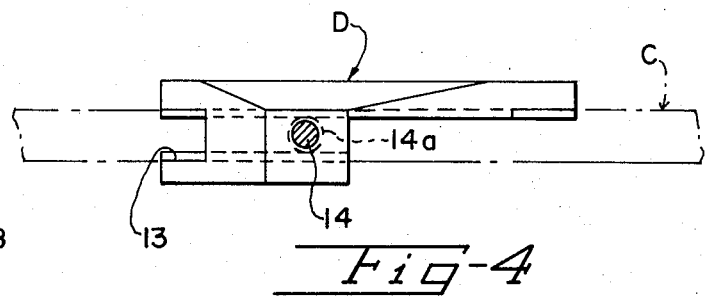
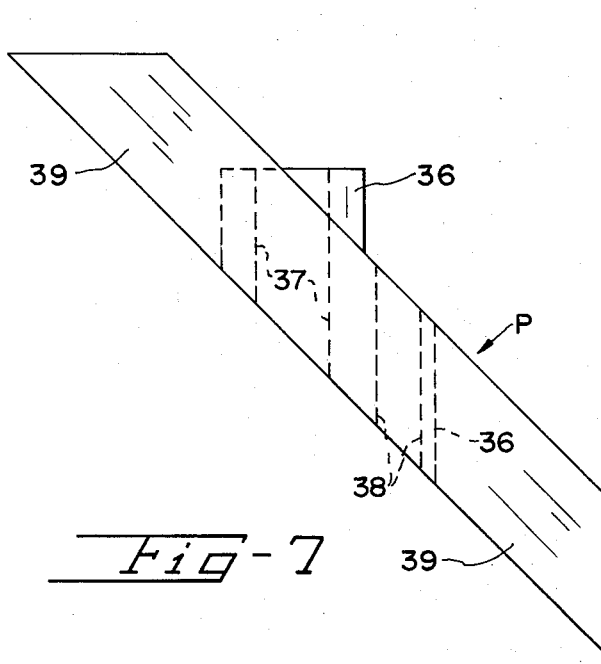
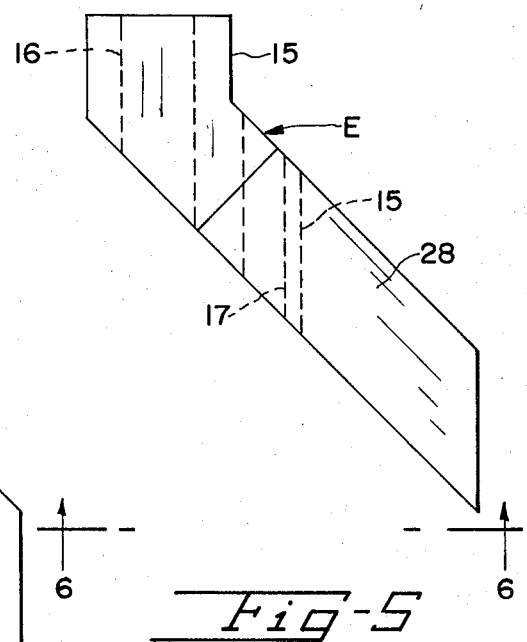
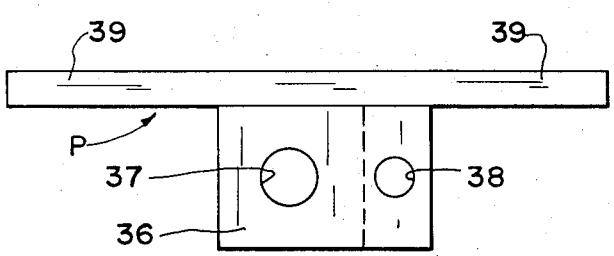
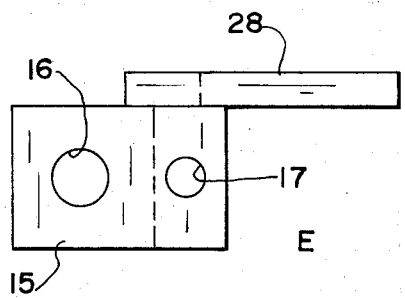

MITER CLAMP VISE AND SAW

BACKGROUND OF THE INVENTION

1. Field of the Invention

The material holding vise and cutting disc are assembled as an integral unit at a fixed 45° angle thus insuring a dead accurate mitered cut of 45° right or left. This unit is rotatably mounted on a stationary base allowing it to pivot freely about its axis. This allows the material to be mitered to be of indefinite length yet worked in a confined area; i.e. material is passed from left to right through the material holding vises and alternate 45° miter cuts are made by rotating the integral vise and cutting unit 90° clockwise and counterclockwise from parallel position with respect to that vise clamp which is holding material. The material holding vise unit may also be locked in a stationary position when used to join two previously mitered pieces.

The two work gripping clamps on the platform are arranged one on each side of a central saw receiving slot in the platform and the movable clamping jaw of each clamp is moved toward or away from the stationary clamping jaw by a threaded shaft which is rotated by a handle that faces toward the operator. The two shafts parallel each other, one being arranged on each side of the central slot. The two handles can be manipulated by the operator without his having to move from side to side of the platform when aligning material to be joined. Each handle is pivotally connected to its threaded shaft and the handle has a cam portion that will move the shaft and movable clamping jaw into gripping engagement with the work when the handle is swung into an inoperative and locking position. This clamp lockin action eliminates the rising or the drifting of the moulding material, a characteristic which occurs in a twistlocking action as is found in other miter clamp designs, such as the Dipworth U.S. Pat. No. 960,159.

The compact design of the unit makes the device readily portable and capable of being table bench or stand mounted.

2. Description of the Prior Art

The patent to Hermon B. Dipworth, U.S. Pat. No. 960,159, on a Miter Clamp Vise discloses a table with two material clamping members, one being disposed on each side of a central saw-receiving slot. The clamping members will grip the work so as to arrange the pieces at a 45° angle to the central slot and at a 90° angle with respect to each other. An adjusting screw is provided for each clamping member and the screw is rotated by a handwheel provided at the rear end of the screw. This arrangement of the handwheels at the rear of the table makes it very inconvenient for an operator to manually actuate the handwheels while standing in front of the device. Of even greater disadvantage is the method used to firmly secure the material to be mitered and/or joined as when tightening pressure is applied by turning the handwheel in the Dipworth U.S. Pat. No. 960,159. This motion will cause the material to lift or shift in its position and this will result in an inaccurate cut or an improper alignment of the pieces being joined.

Also when the Dipworth device is used for joining two mitered pieces together, the juncture of the two mitered ends, when held in abutting relation by the two clamps, will be pointing away from the operator and the lengths of the two pieces will extend forwardly, one on each side of the operator. In the present device the reverse is true inasmuch as the two pieces, when gripped by the two clamping means, will position the mitered ends forwardly and in abutting relation where the two pieces can be fastened together by nails, etc. The remaining lengths of the pieces will extend away from the operator rather than toward him. This will give the operator far more freedom when operating the device.

SUMMARY OF THE INVENTION

An object of my invention is to provide a miter clamp and vise in which the work supporting platform is rotatably supported on a base and the platform can be swung into any angular position desired. The two adjustable clamps are arranged at a ninety degree angle with respect to each other and the clamps are arranged one on each side of a central saw-receiving slot in the platform so that each clamp will grip the work and hold it as a 45° angle with respect to the slot. A disc saw can be swung from an inoperative position into operative position for cutting the work to form either a right hand or left hand miter cut.

In actual operation, the elongated material to be mitered (which may be of indefinite length) is fed from left to right through the left hand vise or clamping mechanism just far enough to allow the cutting disc to pass completely through the material during the cutting operation. The material is locked in place by the vise or clamping mechanism and the mitered cut is completed by lowering the rotating cutting disc through the material. The disc saw is then raised to its resting position and the locking handle for the vise is raised for releasing the clamping action on the material. The operator then lifts the mitered end of the material a sufficient distance to free it from the vise and then the operator rotates the complete disc saw and clamping unit through an arc of 90° clockwise with respect to the elongated piece of material and he then lowers the material into the opened second vise and slides the material from left to right along the open vise until the desired length of material has been measured and then he locks the material in the second vise. The disc saw is then lowered for cutting through the material at the desired point and the disc saw is lifted back to its position of rest. The second vise or clamping mechanism is opened for releasing the cut piece which now has both of its ends mitered and it is ready to be joined to another piece having mitered ends.

BRIEF DESCRIPTION OF THE DRAWINGS

FIG. 3 is an enlarged transverse section taken along the section line 3—3 of FIG. 1 and shows how the stationary jaw of the work-gripping clamp is adjustably connected to the platform so as to permit the lateral shifting of the stationary jaw in the direction of its length, thus permitting the jaw to be shifted into a position for handling work pieces of varying widths.

FIG. 4 is a front elevation of the left hand stationary jaw when looking in the direction of the arrows 4—4 of FIG. 1.

FIG. 5 is an enlarged top plan view of the left hand movable jaw shown in FIG. 1. This jaw is shorter in length than the movable jaw shown in FIG. 7.

FIG. 6 is a front elevation of FIG. 5 when looking in the direction of the arrows 6—6.

FIG. 7 is a top plan view of a longer length movable jaw than the one shown in FIG. 5 and it is interchangeable therewith. FIG. 7 is on the same scale as FIG. 5.

FIG. 8 is a front elevation of FIG. 7 when looking in the direction of the arrows 8—8.

DESCRIPTION OF THE PREFERRED EMBODIMENTS

Figures 2, 9:
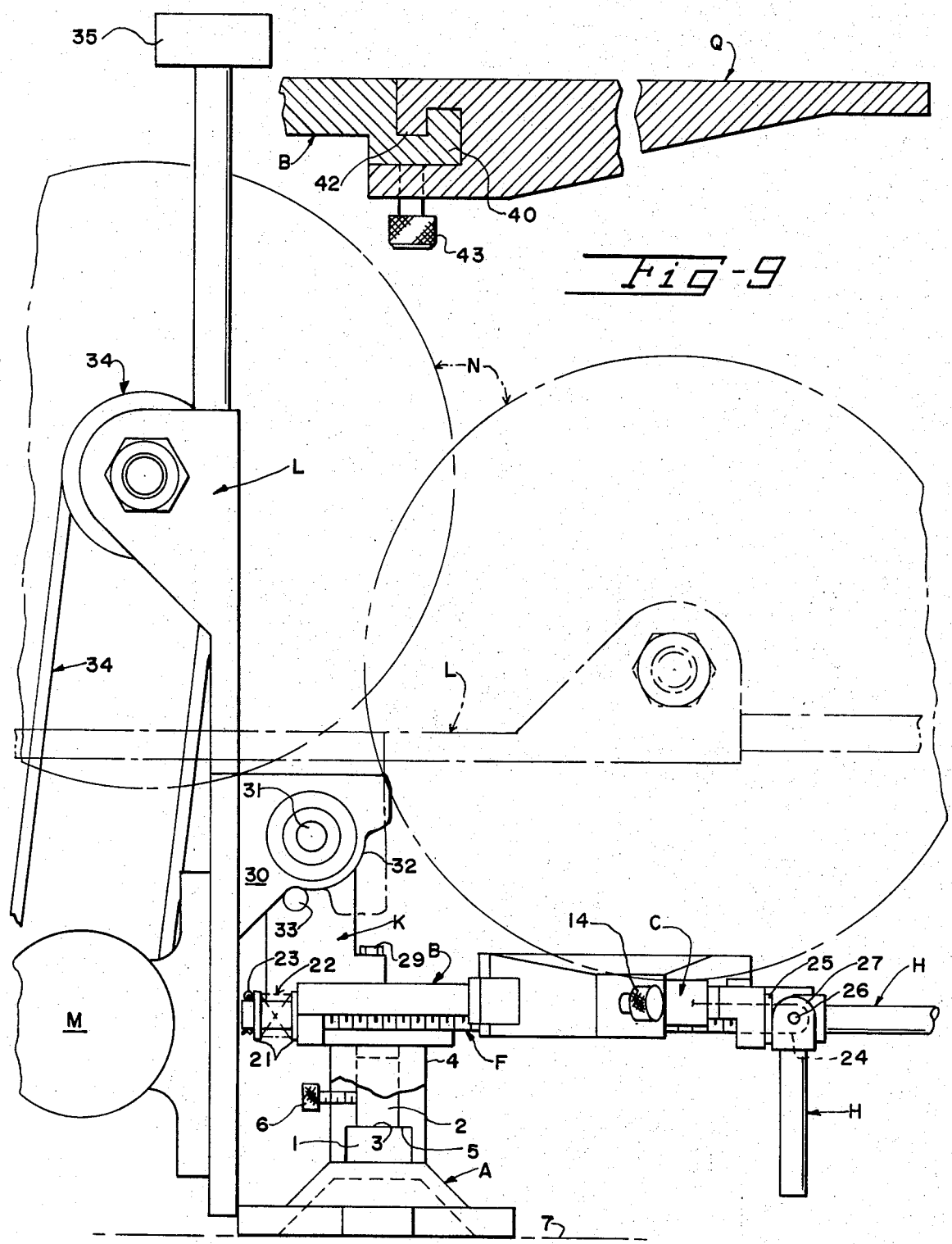
FIG. 2 is a side elevation of the device when looking in the direction of the arrows 2—2 from the left hand side of FIG. 1. Portions of this Figure are shown in section for clarity. The disc saw is shown in inoperative position by full lines and in operative position by dot-dash lines.
FIG. 9 is an enlarged transverse section taken along the line 9—9 of FIG. 1 and shows a scale removably secured to the platform.

In carrying out my invention I provide a platform supporting base A, see FIG. 2, and this base has an upwardly extending cylindrical support 1 with a reduced cylindrical concentric portion 2 providing an annular shoulder 3. A work-supporting platform B, illustrated in FIGS. 1 and 2, has an integral and downwardly extending cylindrical portion 4 that rotatably receives the upwardly extending bearing formed of the portions 1 and 2. The cylindrical portion 4 is integral with the platform B and the cylindrical interior of the portion 4 has an annular shoulder 5 that rides on the annular shoulder 3 for supporting the platform and permitting it to be rotated through a complete circle of 360°. A set screw 6 is carried by the cylindrical portion 4 and it may be tightened against the cylindrical portion 2 of the base A for securing the platform from rotating. The base A may be secured to a supporting surface 7, see FIG. 2, such as the top of a bench or work table.

Figure 1:
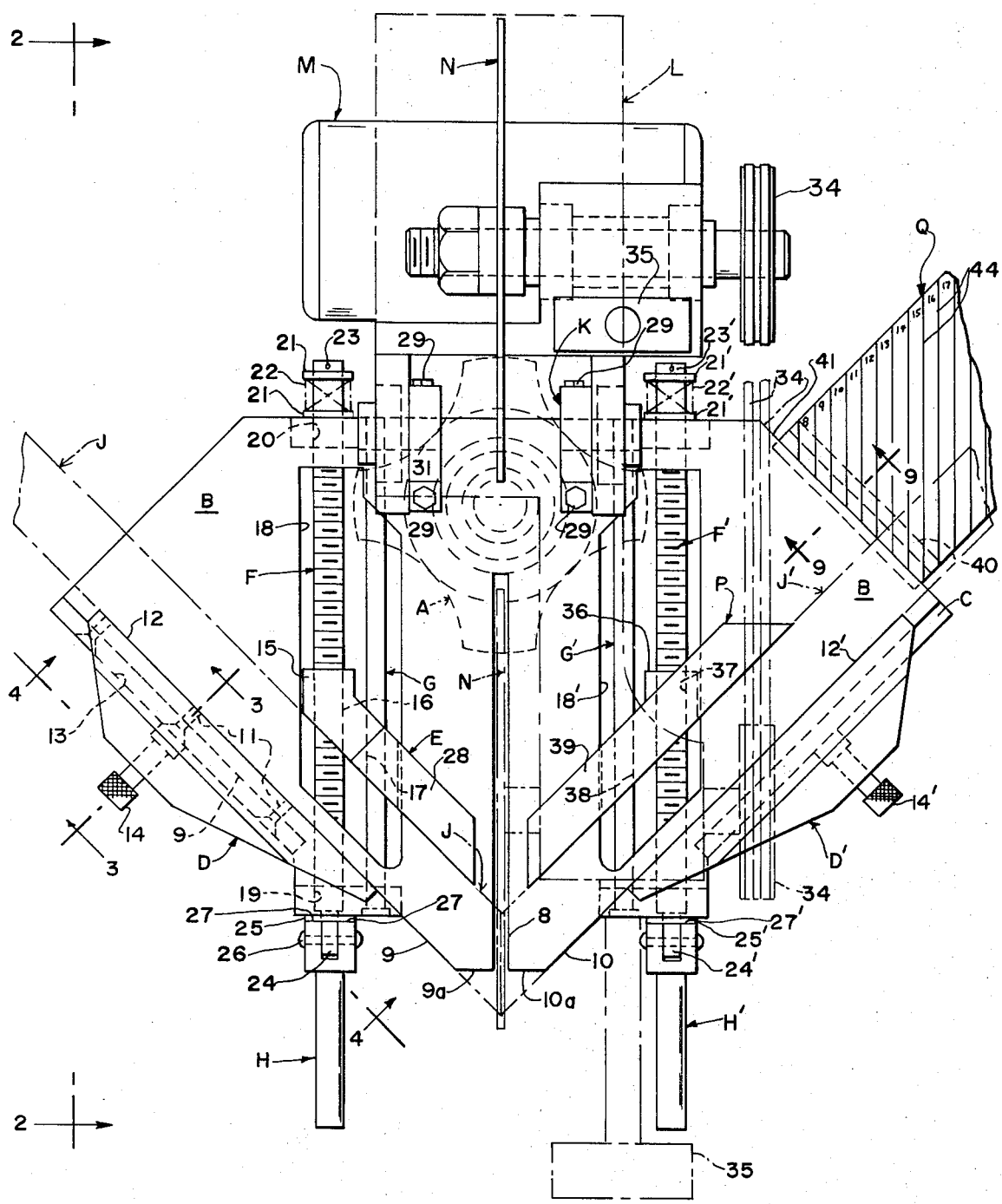
FIG. 1 is a top plan view of the device and shows the disc saw in inoperative position by full lines and in operative position by dot-dash lines.

A top plan view of the platform B is shown in FIG. 1, and the midportion of the platform has a saw-receiving slot 8 therein. The platform has two front edges, a left hand edge 9 that makes a 45° angle with the slot 8 and a right hand edge 10 that also makes a 45° angle with the same slot. Therefore the two edges 9 and 10 will makes a 90° angle with respect to each other with the exception of two small front portions 9a and 10a that lie adjacent to the median saw receiving slot 8 and their purpose will be hereinafter pointed out. The two small front portions 9a and 10a are in alignment with each other and they extend at right angles to the slot 8.

The platform B supports two identical work-gripping vises, a left hand vise positioned to the left of the saw-receiving table slot 8, and a right hand vise which is positioned to the right of the same slot. Since both vises are identical to each other, I will only describe in detail the left hand vise and like characters will be applied to similar parts in the right hand vise, but these will be primed.

The left hand vise or material clamping member comprises a stationary jaw which is shown in FIGS. 1, 2, 3 and 4. Both FIGS. 1 and 3 show a guide strip C made of hardened steel and which is secured to the left edge 9 of the platform by screws 11 with conical heads received in conical openings in the guide strip. It will be seen from FIG. 1 that the portion of the side 9 that receives the guide strip C is not in alignment with the forward portion 9 that lies adjacent to the short front portion 9a, but the two portions 9 do parallel each other. The reason for this variation is that the guide strip C slidably receives a stationary jaw D and the work contacting edge 12 of the jaw is in alignment with the forward portion 9 of the platform edge.

FIG. 3 shows the guide strip C with its upper edge projecting above the top surface of the platform B and its lower edge projecting below the undersurface of the platform. The stationary jaw D has a longitudinal groove 13 that parallels the work contacting face 12 of the jaw and the groove. The stationary jaw may be shifted laterally along the guide strip C into the desired position. A set screw 14 is carried by the left stationary jaw D and it contacts a buffer disc 14a that is slidably mounted in an enlarged cylindrical bore in the jaw. The disc 14a slidably contacts the adjacent surface of the guide strip C, and when the jaw D has been shifted laterally into the desired position, the screw 14 can be tightened and will force the disc 14a against the guide strip for securing the jaw D in adjusted position.

A movable jaw E is shown in top plan in FIG. 1, and this jaw can be moved toward and away from the stationary jaw D by a novel spring-loaded mechanism that can also lock the jaw from movement. I make use of two types of movable jaws, one that is short in length, see FIGS. 1, 5 and 6, for handling small work pieces and one that is longer in length, see FIGS. 1, 7, and 8, for handling longer work pieces. I will first describe the short length movable jaw and the operating mechanism therefor.

The shorter length movable jaw E is shown in top plan view in FIGS. 1 and 5 and in front elevation in FIG. 6. The jaw has a body portion 15 that has a threaded bore 16 for receiving a threaded rod F, and also has a smaller diameter bore 17 for receiving a guide rod G. Referring to FIG. 1, it will be seen that the platform B has an opening 18 therein for receiving the body 15 of the shorter length movable jaw E. The left hand threaded shaft F extends along this opening and its axis parallels the length of the saw-receiving slot 8 in the platform. The threaded rod F is received in the threaded bore 17 in the body 16 and the ends of the rod are non-threaded and are rotatably received in a front bearing 19 and a rear bearing 20. The rod F can also be shifted in the direction of its axis for a purpose presently to be described. The rear end of the rod F projects beyond the rear end of the platform B, and a pair of washers 21 are mounted on the rod in spaced apart relation. A coil spring 22, schematically shown in FIG. 1, is mounted on the rod F, and in back of the rearmost washer 21 for holding the assembly in place.

The front non-threaded end of the rod F that is received in the front bearing 19, see FIG. 1, has a flattened portion 24 that projects through a front washer 25 that bears against the front edge of the platform. This flattened front end 24 of the rod F has the clevis portion of a handle H pivotally connected to it by a pin 26, see also FIG. 2. The edges of the clevis portion of the handle H are cam-shaped. Both FIGS. 1 and 2 show the handle H extending straight forward so that its axis coincides with the axis of the rod F. The handle H in this position will have its cam edges 27 contacting the front washer 25 with less force and the coil spring 22 on the rear end of the rod F will yieldingly urge the rod F rearwardly in order to keep the clevis of the handle H in contact with the front washer 25.

The left hand movable jaw E has its body portion 15 movably received in the platform slot 18 as the handle H rotates the rod F for having its threaded portion advance the movable jaw E toward or away from the stationary jaw D. The movable jaw E has a work-engaging portion 28 that overlies a portion of the platform B, as shown in FIG. 1. In actual practice a work piece J is placed against the work contacting face 12 of the stationary jaw D, and then the handle H is swung from a depending position, shown by the dot-dash lines in FIG. 2, into a horizontal position as shown by the full lines in the same position and then the handle H is rotated on its axis for rotating the rod F in the correct direction for advancing the movable jaw E toward the work piece. When the movable jaw E engages with the work piece J, the operator will rotate the handle in a reverse direction for about one and one-half turns, and then will swing the handle H downwardly about its pivot 26. This will cause the cam edges 27 on the clevis portion of the handle to bear against the front washer 25 and to urge the rod F forwardly for compressing the coil spring 22 mounted at the rear end of the rod. In this manner the handle H, when in the depending dot-dash line position of FIG. 2, will lock the rod F against accidental movement and the work piece F will be firmly secured in place.

I also illustrate in FIG. 1, the left hand guide rod G and this rod is slidably received in the smooth guide bore 7 in the body 15 of the movable jaw 15. The guide rod G has its front and rear ends secured to the platform B, and the greater portion of the length of the guide rod is positioned in the left hand opening in the platform. The guide rod will maintain the movable jaw E in a position so that its work engaging portion 28 will overlie the upper surface of the platform B at all times.

I will now describe the work cutting mechanism that will cut the end of the work piece J that overlies the central slot 8 in the platform B at an angle of 45° to the length of the work piece. In FIGS. 1 and 2, I show the work piece cutting mechanism being removably mounted on the platform B and supported by a pair of spaced apart saw arm supports K. Bolts 29 removably secure the saw arm supports to the platform B. A saw arm assembly includes a swingable side member L, with its integral and downwardly extending side portions 30 that receive an arbor shaft 31 that also extends through the saw arm supports K. Each side portion has an arcuate portion 32, see FIG. 2, that has a stop shoulder at each end that contacts a stop pin 33 for limiting the swinging of the platform L between its inoperative position, shown by the full lines, and its operative position, shown by the dot-dash lines.

The swingable platform L has an electric motor M mounted on it and this motor rotates a disc saw N by means of belts and pulleys indicated generally at 34. The motor M is mounted on one side of the pivot 31 for the platform L while the disc saw N is mounted on the other side. I provide a handle 35 for swinging the platform L, and the handle extends forwardly from the front edge thereof. The operator can grasp the handle 35 for swinging the platform L from inoperative to operative position. The motor M is heavy enough to hold the platform L in an inoperative position as shown by the full lines in FIG. 2.

As stated earlier, I provide a movable jaw E which is shorter in length and I also provide another movable jaw P that is longer in length, see FIGS. 1, 7 and 8. In FIG. 1, I show the longer length movable jaw P operatively connected to the right hand threaded rod F', although this rod F' could be provided with another smaller length movable jaw, similar to the movable jaw E. The movable jaw P is shown o a larger scale in on 7 and 8, and it has a body portion 36 with a large threaded opening 37 for receiving the threaded rod F' and a smaller diameter opening 38 for slidably receiving the guide rod G'. The work engaging part 39 of the movable jaw P is integral with the body portion 36 and it extends over a portion of the upper surface of the platform B. The longer movable jaw P is shown engaging with a second work piece J', in FIG. 1, and forcing this piece against the stationary jaw D'.

It is possible to measure the lengths of the pieces J or J' which are to be cut. I make use of a removable scale, indicated generally at Q in FIGS. 1 and 9. The work supporting platform B has a channel-shaped portion 40 extending along its rear edge 41. This rear platform edge 41 parallels the work contacting face 12 of the stationary jaw D. The removable scale Q may be of any length desired and it has a hook-shaped groove 41, see FIG. 9, for slidably receiving the channel-shaped portion 40. A set screw 43, carried by the removable scale Q, secures the scale to the work platform B.

Reference to FIG. 1 shows the upper surface of the removable scale Q provided with a plurality of parallel lines or scale markings 44 that are 1 inch apart and are numbered as shown. These scale markings parallel the disc saw receiving slot 8 which is the zero position for the scale. Of course the scale markings 44 may be made any distance apart that is desired and I do not wish to be confined to there being only 1 inch apart as shown.

OPERATION

From the foregoing description of the various parts of the device the operation thereof may be readily understood. Usually either two movable jaws E, a left hand one and a right hand one, are used at the same time or the longer movable jaws P, a right and a left hand one, are used at the same time. I have shown one of each in FIG. 1, to illustrate how they are used.

The operator in making a complete multi-sided frame, not shown, will first use the disc saw and the two vises for cutting four frame pieces from stock of the desired width. Both of the right and left hand vises are used for holding the frame pieces and the vises are operated in the manner already set forth for the left hand vise. The vise operating handles H and H' will hold the pieces in proper position for the cutting operation and the operator can make right and left hand 45° angle cuts by merely swinging the disc saw from inoperative to operative position, the saw being received in the platform slot 8 as it moves through the work piece. The swingable platform L will be held in inoperative or operative positions by the stop pin 33. Of course the starting switch, not shown, for the motor M is turned on when using the disc saw. When long pieces of work are to be cut, the work-supporting platform B may be rotated into any desired angular position about its supporting base A.

The cutting of the work pieces is done at the front of the platform B and the actuating handles H and H' for the two vises are likewise operated from the front end of the table. The handle 35 for swinging the disc saw supporting platform L is also done from the front of the table. The stationary jaws D and D' may be shifted laterally for handling different widths of material.

When using the device for securing the precut frame pieces together, the two adjacent pices J and J' have their mitered ends brought together adjacent to the platform slot 8 and the two ends of these pieces project beyond the cut-off portions 9a and 10a of the platform so as to expose the corner of the frame and permit the operator to secure the two ends together by nails or other fastening means. Of course, the two pieces are firmly held in proper position by the two vises during this operation.

The main purpose of my device is to permit the operator to handle moulding pieces of indefinite length and cut smaller pieces from the long piece, these cuts being at 45° angles to the length of the long piece. For example, a long piece 12 or more feet in length can be placed in front of the operator with the length of the piece extending off to the left hand side of the operator. The platform B is rotated to bring the jaws D and 28 of the left hand vise into parallel arrangement with the length of the elongated piece J and the right hand end of the piece can be moved down into the open vise, care being taken that the right hand end of the piece projects past the saw-receiving slot 8. The handle H is rotated for moving the jaw 28 against the piece J and then the handle is rotated and the handle swung downwardly as already explained for causing the left hand vise to grip the piece. The disc saw N is now swung downwardly to cut the piece J at a 45° angle and is swung back into its rest position.

Then the operator opens the left hand vise and lifts the piece above the vise while swinging the platform B clockwise through a 90° angle for aligning the right hand vise with the same elongated piece. Note that the piece J does not have to be moved other than lifting above the left hand vise after the cut has been made and then lowering the piece into the open right hand vise since the jaw P has been previously moved away from the jaw D' to provide sufficient space to receive the piece J.

Next the operator moves the piece J in the direction of its length and through the open right hand vise until the desired length has been measured, care being taken that the place to make the second cut on the piece J is in alignment with the saw receiving slot 8 in the platform B. The right hand vise is actuated by the operator rotating the right hand handle H' in the manner already described for causing the right hand vise to grip the piece J. It should be noted that the left hand jaw D has been moved far enough away from the saw receiving slot 8 to permit the piece J to lie flat on the platform B while it is gripped by the right hand vise. The disc saw N is lowered and will make the second cut on the piece J at the desired place and at the required 45° angle. The cut piece will have both ends mitered properly and this piece can be removed from the right hand vise after opening it in the manner previously described. The cut piece is now ready to be joined to other pieces that have mitered ends and of the proper lengths.

The device can be used for holding the mitered ends of two properly cut pieces together for permanently joining these mitered ends together. No further description of joining the pieces to form a frame or the like need be given.

I claim:

1. In combination:
   a. a base;
   b. a work supporting platform carried by said base and being swingable through a complete circle and about a vertical axis, said platform having a slot for receiving a disc saw;
   c. a first work-gripping vise carried by said platform and being disposed at the left hand side of the slot and adapted to grip an elongated work piece and hold it at a 45° angle with respect to the length of the slot;
   d. a second work-gripping vise carried by said platform and being disposed on the right hand side of the slot and adapted to grip the elongated work piece and hold it at a 45° angle with respect to the length of the slot and at a 90° angle with respect to said first vise; and
   e. a disc saw movable from a rest portion disposed above the platform into an operative position and passing through the slot for cutting the portion of the elongated work piece at a 45° angle with respect to the length of the work piece;
   f. whereby the elongated work piece may occupy a certain position when gripped by said first vise during the first cutting operation and after the first cut has been made the work piece can be freed from said first vise and said platform rotated for bringing said second vise into registry with the work piece whereupon the work piece can be moved in the direction of its length a distance equal to the length of the piece to be cut and then the second vise can grip the work piece and the disc saw make its second cut which will be at a 90° angle to the first cut.

2. The combination as set forth in claim 1: and in which
   a. a member is removably secured to said platform and has a scale marked thereon that is associated with said second vise, the calibrations on said scale measuring the distance from said saw-receiving slot and the scale being used for measuring the desired length of the piece to be cut from the elongated work piece.

3. The combination as set forth in claim 1: and in which
   a. each of said first and second vises has a threaded screw whose axis parallels the length of the platform slot;
   b. a movable jaw having a threaded connection with said screw so that a rotation of said screw will move said jaw;
   c. a stationary jaw carried by said platform and cooperating with said movable jaw for gripping the elongated work piece;
   d. said screw being rotatably supported by said platform so that the screw can be moved in the direction of its length a predetermined distance;
   e. spring means for urging said screw in the direction of its length for yieldingly maintaining said screw in a position where the screw and its movable jaw can be manually moved a predetermined distance toward said stationary jaw;
   f. a handle pivotally secured to the end of said screw disposed nearest to said stationary jaw for rotating said screw when said handle is in a position where the axis of the handle is in alignment with the axis of said screw, said handle having a cam portion adapted to be brought into contact with said platform for moving said screw and movable jaw toward said stationary jaw for gripping the work piece between the two jaws when said handle is swung into a position at right angles to the screw.

4. The combination as set forth in claim 3: and in which
 a. a guide rod parallels said threaded screw and is secured to said platform; and
 b. said movable jaw having a bore for receiving said rod;
 c. whereby said rod will guide said movable jaw when said handle rotates said screw.

5. The combination as set forth in claim 3: and in which
 a. each of said stationary jaws has a work engaging face that makes a 45° angle to the length of the saw receiving slot;
 b. means for adjustably securing each stationary jaw to said platform, said means permitting each stationary jaw to be shifted laterally while maintaining the work engaging face in the same plane during this shifting, after which said stationary jaw is secured in adjusted position;
 c. whereby each stationary jaw can be shifted laterally to provide sufficient space on the surface of said platform to receive a portion of the elongated work piece when the work piece is gripped by the other vise.

* * * * *